July 9, 1940.  W. J. CLEMENT  2,207,455
HAMMER UNIT FOR GRINDERS, CRUSHERS, PULVERIZERS, OR SIMILAR MILLS
Filed Sept. 15, 1938  2 Sheets-Sheet 1
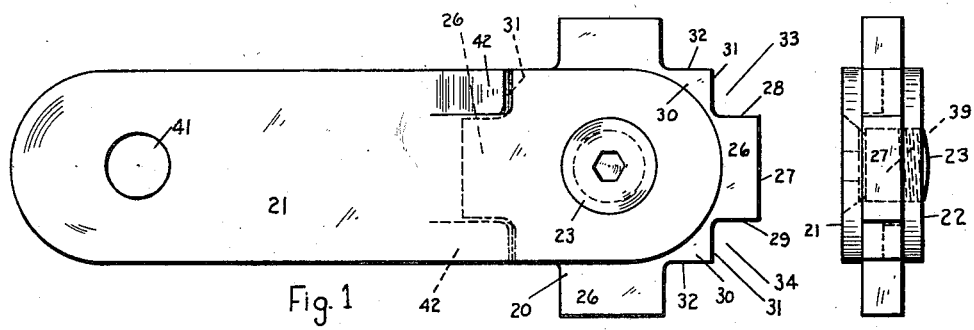
Fig. 1  Fig. 2
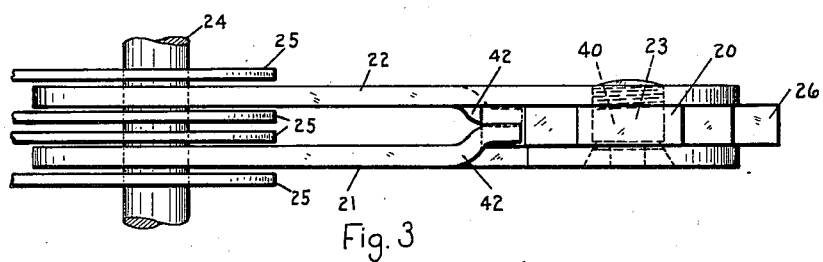
Fig. 3
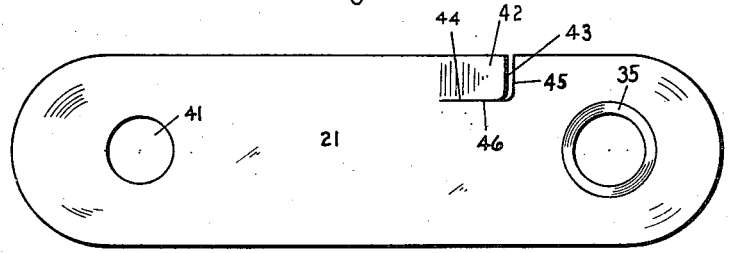 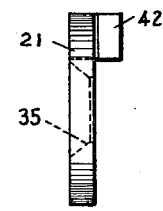
Fig. 4  Fig. 5
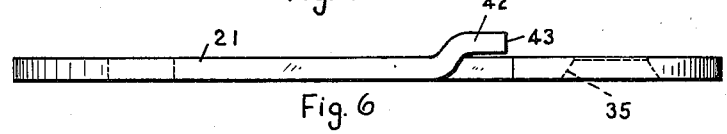
Fig. 6
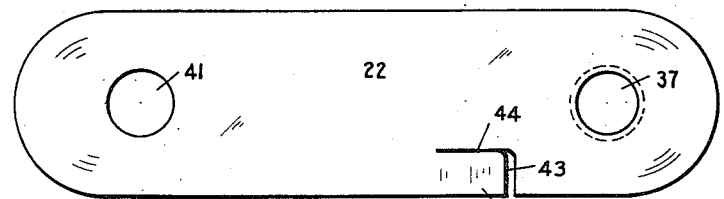 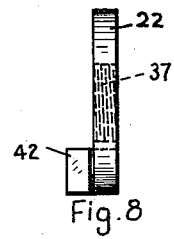
Fig. 7  Fig. 8
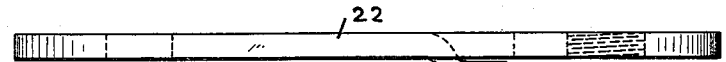
Fig. 9  Fig. 10
INVENTOR
WALTER J. CLEMENT
BY Martin & Rendell
ATTORNEYS

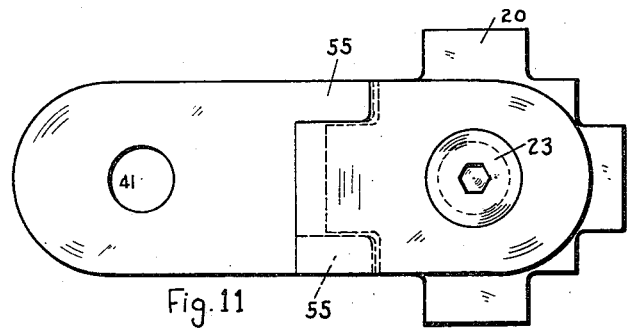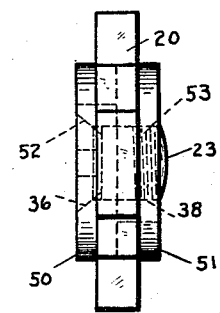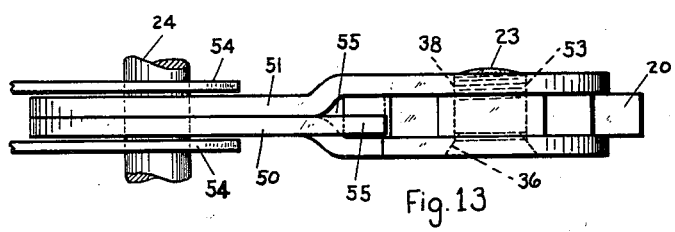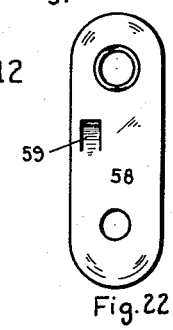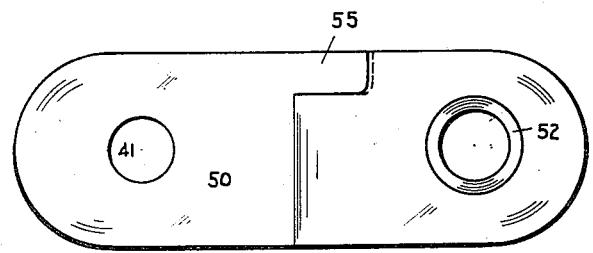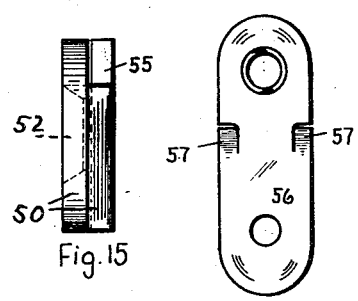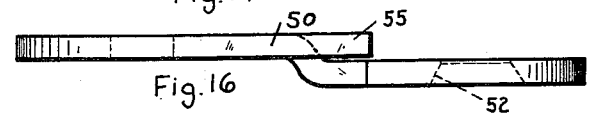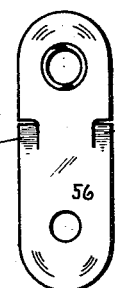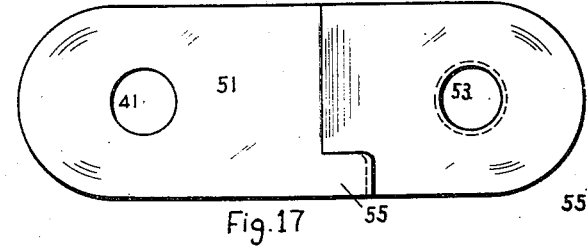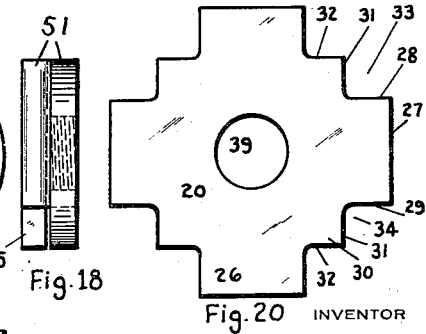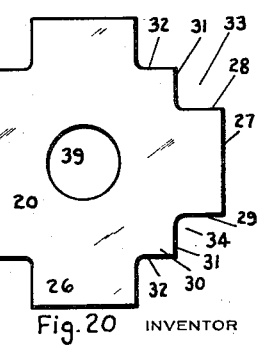

Patented July 9, 1940

2,207,455

UNITED STATES PATENT OFFICE 2,207,455

HAMMER UNIT FOR GRINDERS, CRUSHERS, PULVERIZERS, OR SIMILAR MILLS

Walter J. Clement, New Hartford, N. Y., assignor to The Bossert Company, Inc., Utica, N. Y., a corporation of New York Application September 15, 1938, Serial No. 230,033

9 Claims. (Cl. 83—11)

The object of this invention is to provide a new and improved form of hammer unit for a grinder, crusher or pulverizer or similar mill of the swinging hammer type and more particularly to provide a device of the class described which is of new and improved form, simple in construction, reliable and effective in operation and one wherein new and improved means are provided for locking the hammer in desired position relative to the supports therefor.

A further purpose is to provide a hammer unit of the type indicated where the hammer locking means are integral with one or both of the hammer supports and so reduce the required number of parts to form a hammer unit having locking means.

A still further purpose is to provide a hammer unit having locking means that are simple and effective but very strong and durable and practically impossible of getting out of order and yet which locking means are of such character and such co-operation with the other parts of the hammer unit as to allow the hammer or hammer head to be rotated to a new position without disconnecting the hammer supports from the hammer rods upon the rotating disks, by simply withdrawing or moving the hammer outwardly relative to its pair of supports upon removing the hammer bolt used to normally hold together the pair of supports on the opposite sides of a hammer.

Further purposes and advantages of this invention will appear from the specification and claims herein.

Fig. 1 is a side elevation of one form of a hammer unit of the type indicated and embodying this invention.

Fig. 2 is an end view of said unit as seen from its outer or right hand end.

Fig. 3 is a top view of said hammer unit with adjacent portions of the disks of a hammer mill and with a part of the hammer rod by which this unit is mounted upon said disks.

Fig. 4 is a side elevation of the near hammer support as seen in Figs. 1 and 3 and Fig. 5 is an end elevation thereof as seen from its outer or right hand end.

Fig. 6 is a top view of the support shown in Figs. 4 and 5.

Fig. 7 is a side elevation of the other or farther hammer support as seen in Figs. 1 and 3, the view, however, being of the inner side of said support, that is the side which is next to the hammer.

Fig. 8 is an end view of the support shown in Fig. 7 as seen from its outer or right hand end and Fig. 9 is a top view of the support shown in Fig. 7.

Fig. 10 is a side view of the hammer bolt used with the unit illustrated in Figs. 1 to 3.

Fig. 11 is a side elevation of a second form of a hammer unit embodying this invention and Fig. 12 is an outer or right hand end view of said unit.

Fig. 13 is a top view of the parts of said unit of Figs. 11 and 12 with the addition of adjacent parts of the disks of the hammer mill with which said unit is used, and showing also the adjacent portion of the hammer rod by which the said unit is swingingly mounted upon said disks.

Fig. 14 is a side elevation of the near hammer support of the unit shown in Fig. 11.

Fig. 15 is an end view and Fig. 16 a top and edge view of the hammer support shown in Fig. 14.

Fig. 17 is a side elevation of the other or further hammer support as seen in Figs. 11 and 13, the view however being of the inner side of said support, that is the side which is near to the hammer.

Fig. 18 is an end view of the support shown in Fig. 17 from its outer or right hand end and Fig. 19 is a top edge view of the support shown in Fig. 17.

Fig. 20 is a side elevation or plan view of the hammer shown as used with both forms of my invention.

Fig. 21 is a plan view on a reduced scale of a modified form of a hammer support and Fig. 22 is a similar view of another form of hammer support.

Referring to the drawings in a more detailed description and first to what I will call the first form of the invention and shown in Figs. 1 to 10, it will be seen that the hammer unit consists of a hammer or hammer head 20, two hammer supports 21 and 22 and a hammer bolt 23 connecting and adapted to hold in assembled position said hammer and two hammer supports and that my invention adds to these parts means for locking the hammer in non-rotative position without adding to the number of parts in the unit.

The hammer or hammer head 20 is of the type having a plurality of generally similar working faces and the problem was to provide simple means for locking the hammer inposition relative to its pair of hammer supports so that the one desired working face or set of working faces would be held in operative position until the relative position of the hammer was deliberately changed and then to allow such changing of position of the hammer as to bring a new working face or set of working faces into operative position or even to substitute a new hammer for the old one, and to preferably have all of such changes made without having to disconnect the inner ends of the hammer supports 21 and 22 from the hammer rod 24 by means of which rod the inner ends of the said hammer supports are swingingly mounted relative to the rotated discs 25 of the grinder, crusher or pulverizer or similar mill with which the hammer unit is to be used.

For definiteness of description and illustration I have shown one common type of hammer in the drawings but it will be understood that the use of this particular type of hammer is simply illustrative and that my invention is not limited to the particular type of hammer shown and hereinafter described any further than is required by the claims herein.

The hammer with which I have chosen to illustrate my invention has a plurality, commonly four, of similar and symmetrically arranged radially extending projections 26 on the disc-like hammer 20. Each of these projections commonly has a flat outer face 27 and in the preferred form of my invention two side faces 28 and 29 which are at right angles to the outer face 27 and accordingly parallel to each other. Preferably also between the adjacent projections 26 there are intermediate step-like projections 30 having their faces 31 and 32 at right angles to each other, assuming that there are four of the main projections 26 provided upon the hammer. Assuming that the hammer unit shown in Fig. 1 is rotated in an anti-clockwise direction the upper face 28 of the main projection 26 that extends to the right in said view will be the main working face and the upper face 32 of the step-like projection 31 immediately above said right hand main projection 26 will form a supplemental working face thus getting a set of working faces consisting of the face 28 and the supplemental face 32. It will be understood of course that since the swinging hammer mill is constructed to always rotate in one direction the face 29 upon said right hand projection 26 and the now horizontal face 32 of the step-like projection 30 immediately below said right hand main projection 26 will be brought into operation as a set of working faces by reversing side for side the position of said hammer in its pair of hammer supports 21 and 22. It will be seen in Figs. 1, 2 and 3, therefore, that the hammer shown will have four sets of working faces operative successively by successively rotating the hammer in its supports to its four different positions and that then, by reversing the hammer in its hammer supports, the other four sets of working faces may be successively brought into operative position. This system of obtaining eight sets of working faces is not new with this invention but is mentioned at this time in order to show that this method of utilizing all eight sets of working faces upon this shape of hammer still is usable and practicable with my invention and that the locking mechanism herein shown and described does not reduce or interfere with any of the said adjustments of said hammer. In fact my locking means is not only consistent with the use of this shape of hammer or hammer head but utilizes in certain of my claims the special shape of the hammer so illustrated.

For use hereafter in describing the operation of my locking means attention may now be called to the fact that the angle between the face 28 of a main projection 26 and the adjacent face 31 of an intermediate step-like projection 30 forms a notch 33. Similarly the angle between the other side face 29 of one main projection 26 and its adjacent face 31 of the intermediate step 30 on the other side of said main projection 26 forms a similar notch 34 on that side of said projection 26. It will be seen that as long as the hammer head is provided with four equally spaced main projections 26 and with right-angle formed step-like projections 30 between adjacent main projections the notches 33 and 34 will have their faces at right angles to each other. It will be seen however that if the form or arrangement of the intermediate step-like projections be changed the shape of these notches will be changed accordingly but as long as the notches are adjacent each main projection 26 and open lengthwise of the hammer unit, they will be within the scope of certain of the claims herein.

The hammer head 20 is provided with a centrally placed circular aperture 39 adapted to relatively closely fit the smooth round shank portion 40 of the hammer bolt 23 so that said hammer will be supported on a large true bearing.

The two strap-like hammer supports 21 and 22 are duplicates except that the near support 21 as seen in Figs. 1 and 3 has a countersunk aperture 35 in its outer end to fit the tapered or undercut or countersunk head 36 of the hammer bolt 23 while the corresponding aperture 37 in the other support 22 is screw-threaded to engage the threaded end 38 of the hammer bolt 23. With this exception the said two hammer supports are so far alike that they may be and are in practice formed by the same set of forming and finishing dies, which is obviously a manufacturing advantage.

Both of these strap-like supports 21 and 22 are formed with circular apertures 41 near their inner ends, extending at right angles to the flat side of the said supports through the thickness thereof so as to swingingly support the inner ends of said supports upon any one of the hammer rods 24 of the mill in the usual way.

The near hammer support 21 is provided near and preferably at its upper edge, as seen in Figs. 1 and 4, with a lug 42. This lug is offset inwardly relative to the outer portion or end of this support which directly engages the adjacent flat side of the hammer so that the lug is brought more or less and preferably for its full thickness into the plane of the adjacent flatwise half of the hammer. In ordinary construction the hammer will be about twice the thickness of the hammer support so that by offsetting inwardly this lug 42 for its whole thickness the whole thickness of the lug will be opposite the near flatwise half of the hammer. The said lug is so shaped and so formed relative to the hammer as to provide an end face 43 and an inward or lower face 44, as the lug is seen in Figs. 1 and 4. The end face 43 is so formed and shaped as to relatively closely approach or fit the adjacent face of the notch provided opposite thereto in the hammer 20, and the face 44 of said lug is so made and relatively positioned as to closely approach or fit the other face of the notch provided in the hammer into which notch the said lug projects lengthwise of said support, it being understood that said lug projects outwardly of the mill or outwardly and generally lengthwise of said hammer support 21. The projection of this lug into such notch obviously forms a locking means for preventing the rotation of the hammer when it is held assembled relative to this hammer support.

For convenience and economy in manufacture and for strength and simplicity in assembling and use the said lug 42 is formed integral with its said hammer support 21 but, as will be seen from certain of the claims herein it is within the scope of my invention that said lug might be a piece separate from the hammer support but fastened thereto, so long as it forms an offset lug adapted to project into a notch or an angle in the hammer head for the purpose of preventing rotation of said hammer head relative to the said hammer supports when the parts of the hammer unit are assembled.

Preferably this inwardly offset lug 42 is formed by a stamping and pressing operation by making a clear or sharp cut in the support 21 along the line 45 entirely through the metal of said support and at right angles to the flat sides thereof so as to provide the flat face 43 already mentioned as at the outer end of the lug 42. A similar cut entirely through the metal is made on line 46 connecting with the lower inner end of cut or line 45 and extending inwardly lengthwise of the support 21 for the proper distance so as to form the inner side edge 44 of said lug substantially at right angles to the flat sides of said support 21.

Assuming that the hammer unit is being constructed to include a hammer having more or less closely the form of the hammer 20 shown in the drawings and already described in detail the lug 42 will have its outer face 43 extending at a right angle relative to the full flat side of the hammer support and so substantially parallel to the face 31 of the intermediate step 30 that is immediately above the main projecting portion 26 that extends inwardly or to the left as the hammer unit is shown in Fig. 2. Similarly the inner side edge or face 44 of the lug 42 will be parallel to the lengthwise axis of the support 21 and therefore will be substantially parallel to and more or less closely approaching the upper side face of said main projection 26. It will be seen that this upper side face of the main projection 26 and the adjacent inwardly directed face 31 of the intermediate step-like projection 30 already mentioned form an angle or a notch into which sets the said lug 42, and it will be seen that in greater detail the end face 43 of said lug will more or less closely approach and fit the adjacent inwardly directed face of the intermediate step-like projection above the left hand or inwardly directed main projection 26 of the hammer as the parts are seen in Fig. 1. The engagement of these two faces of themselves would operate to prevent rotation of the hammer relative to this hammer support when the parts are assembled. Similarly the inner side face 44 is directed inwardly in a more or less close engagement with the upwardly directed side face of the left hand or inwardly extending main projection 26 upon the hammer as the parts are shown in Fig. 1. The inter-engagement of these two pairs of faces on the lug and hammer will obviously cooperate to surely and positively prevent any rotation of the hammer when the parts are held in assembled position.

There are however many grinding or hammer mills of the type with which these hammer units are to be used where the construction of the hammer mill is such that the inner ends of the necessary pair of hammer supports are required to be or at least are desired to be in the same plane or zone with their respective hammers. The second form of my invention shown in Figs. 10 to 19 inclusive adapts my invention to this form of a hammer mill. It will be seen by inspecting these drawings that they may use, and for definiteness and briefness in description I am using, precisely the same form of hammer 20 as already shown and described in connection with the first form of the invention and the parts of this hammer are as far as necessary similarly numbered without having to describe those parts separately. Also the same hammer bolt 23 is used, as already described, and clamps the outer ends of the two hammer supports 50 and 51 to the opposite broad faces of the hammer 20 as heretofore described, as by the countersunk head 36 of the said bolt extending through a countersunk hole 52 in the outer end of the near hammer support 50, as seen in Figs. 11 and 12, and then with the further screw-threaded end 38 extending into and engaging the screw-threaded aperture 53 in the outer end of the further support 51.

About the whole inner half of the near support 50, however, is offset inwardly and similarly the inner half lengthwise of the further hammer support 51 is offset inwardly relative to the outer half of said further support so that the two inner halves of this pair of hammer supports are brought next to each other upon the hammer rod 24 and between two properly spaced discs 54 on said rod 24 and so with said inner halves occupying the zone or plane as it were, of the hammer head itself, but of course farther in upon the hammer mill. Both the near hammer support 50 and the further hammer support 51 are provided with similar locking lugs 55 which are offset into the adjacent flatwise half of the thickness of the hammer and offset inwardly relative to the outer half of said respective hammer supports that engage flatwise the outer flat faces of the hammer. In this construction however it will be seen that due to the inner halves of the hammer supports 50 and 51 being offset inwardly relative to the outer halves of said hammers, the said locking lugs 55, 55 are in line with the inner halves of said supports 50 and 51, as will be apparent especially from inspection of Fig. 13. In this form of my invention also the near and further hammer supports are formed exactly alike, except for the outer apertures of said supports being countersunk in the case of support 50 and screw-threaded in the case of support 51. In practice in this case also the near and further hammer supports 50 and 51 are not only similar in shape and size but are actually formed by the same blanking and finishing dies, which is obviously a decided manufacturing economy. In this form of the invention also the further hammer support of a hammer unit is placed into the unit in reverse position as by turning the hammer over flatwise so that the locking lug 55 upon the further support 51 will be offset inwardly relative to the outer half of its support and in line with the adjacent flatwise half of the hammer 20. Also it will be seen that this reversing in assembling of the unit of the further hammer support 51 will bring its locking lug 55 to the lower part of the unit as the unit is seen in Fig. 11, and as this further side is seen in side elevation in Fig. 17 in contrast to the lug 55 upon the near support being at the upper part of the unit as seen in Fig. 11 and as seen in the separate side view of this near support in Fig. 14.

As it will be seen that the essential part of my invention is the forming of the locking lugs preferably integral with their respective hammer supports and always in offset relation to the outer half of the hammer supports and so in line to lockingly engage the hammer itself, it will be seen that these locking lugs will cooperate with and form locking engagements with the hammer 20 in precisely the same way and with precisely the same results as already described in detail as to the first form of the invention. Therefore further detailed description of the parts of this form of my invention are unnecessary and will be omitted. The only real difference between this form of hammer unit embodying my invention and the form shown in Figs 1 to 10 is the incidental structure that in this second form of my invention the inner ends of the hammer supports are offset towards each other and into the plane of the hammer. This allows the hammer supports of this form of my invention to be mounted upon the hammer rod 24 and between spaced discs 54. This last mentioned detail however makes more of an apparent difference in the unit than any real difference in the unit, as far as the locking operation thereof is concerned.

Fig. 21 shows in plan view on a reduced scale a modified form of a hammer support 56 having the same general shape and construction as hammer supports 21 and 22, but having two locking lugs 57 and 57 on the respective opposite side edges of the one hammer support 56. Each of the lugs 57 are formed and shaped like the single lug 42 on the near hammer support 21 of the first form of this invention and will function in the same way relative to the hammer head used therewith while the two lugs 57 on the single support 56 will function in the same way as the two separate lugs 42 on the pair of supports 21 and 22 of that form of the invention and accordingly further description of the form and operation of the lugs 57 on support 56 are deemed unnecessary.

Fig. 22 is a plan view on a reduced scale of another form of hammer support 58 having the same general shape and construction as the near hammer support 21 of the first form of my invention and having a single locking lug 59 in the main like lug 42 of said support 21 except that the lug 59 is spaced bodily inwardly from its side edge of its support 58. This can be accomplished with the same shape and size of hammer head 20 as used in the first and second forms of this invention by either making the lug a little narrower or by using a somewhat wider hammer support. This form of hammer support 58 and lug 59 is especially adaptable where the hammer has narrower main projections than shown for the projections 26 of hammer 20. It will be obvious that this lug 59 will function precisely the same as the locking lugs heretofore described in detail so that any further description of the operation of this form of lug 59 is deemed unnecessary.

What I claim as new and desire to secure by Letters Patent is:

1. A swinging hammer unit for use with a hammer rod of a grinder mill, pulverizer or crusher and comprising a centrally apertured flat-sided hammer having a plurality of working faces and having a plurality of notches in its periphery symmetrically arranged relative to the respective working faces, a pair of strap-like hammer supports apertured near their inner ends for being swingingly mounted upon said hammer rod and engaging between their outer ends the broad sides of said hammer, the outer ends of said supports having apertures registering with each other and with the aperture of said hammer, a hammer bolt mounted in the outer apertures of said supports and in the hammer aperture and holding said three members closely together and a lug on one of said supports offset relative to the portion of the support engaging the hammer and projecting outwardly into one of said notches upon the inner part of the hammer whereby the hammer is locked from rotation but may be removed by outward movement thereof without disconnecting the inner ends of said supports from said hammer rod, upon removing said hammer bolt from the hammer.

2. A swinging hammer unit for use with a hammer rod of a grinder mill, pulverizer or crusher and comprising a centrally apertured flat-sided hammer having a plurality of working faces and having a plurality of notches in its periphery symmetrically arranged relative to the respective working faces, a pair of strap-like hammer supports apertured near their inner ends for being swingingly mounted upon said hammer rod and engaging between their outer ends the broad sides of said hammer, the outer ends of said supports having apertures registering with each other and with the aperture of said hammer, a hammer bolt mounted in the outer apertures of said supports and in the hammer aperture and holding said three members closely together and an integral lug on one of said supports offset relative to the portion of the support engaging the hammer and projecting outwardly into one of said notches upon the inner part of the hammer.

3. A swinging hammer unit for use with a hammer rod of a grinder mill, pulverizer or crusher and comprising a centrally apertured flat-sided hammer having a plurality of working faces and having a plurality of notches in its periphery symmetrically arranged relative to the respective working faces, a pair of strap-like hammer supports apertured near their inner ends for being swingingly mounted upon said hammer rod and engaging between their outer ends the broad sides of said hammer, the outer ends of said supports having apertures registering with each other and with the aperture of said hammer, a hammer bolt mounted in the outer apertures of said supports and in the hammer aperture and holding said three members closely together and a lug on one of said supports offset relative to the portion of the support engaging the hammer and projecting longitudinally of the support outwardly into one of said notches upon the inner part of the hammer.

4. A swinging hammer unit for use with a hammer rod of a grinder mill, pulverizer for crusher and comprising a centrally apertured flat-sided hammer having a plurality of working faces and having a plurality of notches in its periphery symmetrically arranged relative to the respective working faces, a pair of strap-like hammer supports apertured near their inner ends for being swingingly mounted upon said hammer rod and engaging between their outer ends the broad sides of said hammer, the outer ends of said supports having apertures registering with each other and with the aperture of said hammer, a hammer bolt mounted in the outer apertures of said supports and in the hammer aperture and holding said three members closely together and a lug on each of said supports offset relative to the portion of the support engaging the hammer and respectively projecting outwardly into one of said notches upon the inner part of the hammer.

5. A swinging hammer unit for use with a hammer rod of a grinder mill, pulverizer or crusher and comprising a centrally apertured flat sided hammer having a plurality of working faces and having a plurality of notches in its periphery symmetrically arranged relative to the respective working faces, a pair of strap-like hammer supports apertured near their inner ends for being swingingly mounted upon said hammer rod and engaging between their outer ends the broad sides of said hammer, the outer ends of said supports having apertures registering with each other and with the aperture of said hammer, a hammer bolt mounted in the outer apertures of said supports and in the hammer aperture and holding said three members closely together and a lug on each of said supports offset relative to the portion of its support engaging the hammer and projecting outwardly into separate spaced notches upon the inner part of the hammer whereby the hammer is locked from rotation but may be removed by outward movement thereof without disconnecting the inner ends of said supports from said hammer rod, upon removing said hammer bolt from the hammer.

6. A swinging hammer unit for use with a hammer rod of a flat-sided hammer mill, and comprising a centrally apertured hammer having a plurality of spaced main projections affording working faces and having notches therebetween, a strap-like hammer support apertured near its inner end for being swingingly mounted upon said hammer rod and engaging near its outer end a broad side of said hammer, the outer end of said support having an aperture registering with the aperture of said hammer, a hammer bolt mounted in the outer aperture of said support and in the hammer aperture and holding said two members closely together and a lug on said support offset relative to the part of the support engaging the hammer and projecting outwardly into one of said notches upon the inner part of the hammer.

7. A swinging hammer unit for use with a hammer rod of a flat sided hammer mill, and comprising a centrally apertured hammer having a plurality of spaced main projections affording working faces, a strap-like hammer support apertured near its inner end for being swingingly mounted upon said hammer rod and engaging near its outer end a broad side of said hammer, the outer end of said support having an aperture registering with the aperture of said hammer, a hammer bolt mounted in the outer aperture of said support and in the hammer aperture and holding said two members closely together and lugs on said support projecting outwardly on opposite sides of one of said main projections on the inner side of the hammer.

8. A swinging hammer unit for use with a hammer rod or a flat-sided hammer mill, and comprising a centrally apertured hammer having a plurality of spaced main projections affording working faces, a pair of strap-like hammer supports apertured near their inner ends for being swingingly mounted upon said hammer rod and engaging between their outer ends the broad sides of said hammer, the outer ends of said supports having apertures registering with each other and with the aperture of said hammer, a hammer bolt mounted in the outer apertures of said supports and in the hammer aperture and holding said three members closely together and lugs on said supports projecting outwardly on opposite sides of one of said main projections upon the inner part of the hammer.

9. A swinging hammer unit for use with a hammer rod of a flat-sided hammer mill and comprising a centrally apertured hammer having a plurality of spaced main projections affording working faces, a pair of strap-like hammer supports apertured near their inner ends for being swingingly mounted upon said hammer rod and engaging between their outer ends the broad sides of said hammer, the outer ends of said supports having apertures registering with each other and with the aperture of said hammer, a hammer bolt mounted in the outer apertures of said supports and in the hammer aperture and holding said three members closely together and lugs on said supports offset relative to the parts of the supports engaging the hammer and projecting outwardly on opposite sides of one of said main projections upon the inner part of the hammer.

WALTER J. CLEMENT.